United States Patent
Fares et al.

(10) Patent No.: US 11,905,210 B1
(45) Date of Patent: Feb. 20, 2024

(54) CEMENTITIOUS MIXTURE AND METHOD OF MAKING THE SAME

(71) Applicant: KING SAUD UNIVERSITY, Riyadh (SA)

(72) Inventors: Galal Fares, Riyadh (SA); Mohammad Iqbal Khan, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/231,948

(22) Filed: Aug. 9, 2023

(51) Int. Cl.
| | |
|---|---|
| *C04B 14/22* | (2006.01) |
| *C04B 7/02* | (2006.01) |
| *C04B 14/06* | (2006.01) |
| *C04B 18/08* | (2006.01) |
| *C04B 24/26* | (2006.01) |
| *C04B 28/04* | (2006.01) |
| *C04B 16/06* | (2006.01) |
| *C04B 20/00* | (2006.01) |
| *C04B 18/14* | (2006.01) |
| *C04B 103/32* | (2006.01) |

(52) U.S. Cl.
CPC ............... *C04B 14/22* (2013.01); *C04B 7/02* (2013.01); *C04B 14/068* (2013.01); *C04B 16/0641* (2013.01); *C04B 18/08* (2013.01); *C04B 18/141* (2013.01); *C04B 20/006* (2013.01); *C04B 24/2664* (2013.01); *C04B 28/04* (2013.01); *C04B 2103/32* (2013.01)

(58) Field of Classification Search
CPC ......... C04B 14/22; C04B 7/02; C04B 14/068; C04B 16/0641; C04B 18/08; C04B 18/141; C04B 20/006; C04B 24/2664; C04B 28/04; C04B 2103/32
See application file for complete search history.

(56) References Cited

U.S. PATENT DOCUMENTS

| 9,399,599 B1 | 7/2016 | Kahn et al. |
| 10,544,060 B2 | 1/2020 | Hoffman |

FOREIGN PATENT DOCUMENTS

| CN | 103467040 A | | 12/2013 |
| CN | 104030617 A | * | 9/2014 |
| CN | 104893694 A | | 9/2015 |
| CN | 107098650 A | * | 8/2017 |
| EP | 2837609 A1 | | 2/2015 |
| RU | 2342342 C1 | | 12/2008 |

OTHER PUBLICATIONS

Islam et al., "Waste glass powder as partial replacement of cement for sustainable concrete practice," International Journal of Sustainable Built Environment, vol. 6, Issue 1, Jun. 2017, pp. 37-44.
Tamanna et al., "Sustainable Use of Recycled Glass Powder as Cement Replacement in Concrete," The Open Waste Management Journal, 2020, vol. 13, pp. 1-13.
Powęzka et al., "Reuse of Heat Resistant Glass Cullet in Cement Composites Subjected to Thermal Load," Materials, 13, 4434; Oct. 5, 2020.

* cited by examiner

*Primary Examiner* — Anthony J Green
(74) *Attorney, Agent, or Firm* — Nath, Goldberg & Meyer; Richard C. Litman

(57) ABSTRACT

The cementitious mixture includes cement with a concentration of between about 5 wt % and about 20 wt %; powdered glass with a concentration of between about 5 wt % and about 35 wt %; fly ash with a concentration of between about 20 wt % and about 40 wt %; sand with a concentration of between about 18 wt % and about 25 wt %; a poly(carboxylate ether)-based superplasticizer with a concentration of between about 0.8 wt % and about 1.2 wt %; and water with a concentration of between about 14 wt % and about 16 wt %. Alternatively, the fly ash may be replaced with ground granulated blast furnace slag (GGBFS). The powdered glass is preferably powdered recycled glass cullet. The glass cullet may be ground to have an average particle size of about 10 μm or less. The sand may be red dune sand, and the cement may be Portland cement or white cement. The cementitious may also include polyvinyl alcohol (PVA) microfibers.

20 Claims, 5 Drawing Sheets

(5 of 5 Drawing Sheet(s) Filed in Color)

US 11,905,210 B1

CEMENTITIOUS MIXTURE AND METHOD OF MAKING THE SAME

BACKGROUND OF THE INVENTION

Field of the Invention

The disclosure of the present patent application relates to cement and cementitious compositions, and particularly to a mixture for a cementitious composition including recycled, ground glass cullet.

Description of Related Art

In order to conserve and recycle base construction materials, building materials made from recycled glass and cement have been investigated. In general, the effective usage of such materials has been difficult, particularly due to the composition of glass, which is primarily silica. Glass in general is prepared from quartz silica (sand of different purities) in the presence of some chemicals to reduce the melting temperature from 1900° C. to near 1000° C. depending on the use of the final products. Silica plays an important role in creating a highly cross-linked network of chemical bonds with all chemical elements in the network.

When glass is combined with cement, the presence of the silica typically causes a reaction with the alkali in cement, causing excessive expansion and cracking or popouts in the concrete, thus rendering it useless as a building material.

It would be desirable to be able to overcome the traditional impediments to recycling glass and combining it with cement to create effective cementitious building materials. Thus, a cementitious mixture and a method of making the same solving the aforementioned problems is desired.

SUMMARY OF THE INVENTION

The amorphous nature of glass makes it a very pozzolanic material that, when optimized, can be successfully used as an alternative supplementary cementitious material for cement. Consumption of glass cullet reduces the pressure on the municipalities all over the world to this universal major problem of recycling waste glass. As described herein, the production of green building materials relying on the recycling of one of the most important postconsumer wastes satisfies the objectives of sustainability. Thus, conserving raw materials and reducing energy consumption can be achieved by the potential recycling of waste glass. This type of valuable waste can be easily classified as renewable and such resources as renewable resources.

Accordingly, in an embodiment, the present subject matter as described herein relates to a cementitious mixture including cement with a concentration of between about 5 wt % and about 20 wt %; powdered glass with a concentration of between about 5 wt % and about 35 wt %; fly ash with a concentration of between about 20 wt % and about 40 wt %; sand with a concentration of between about 18 wt % and about 25 wt %; a poly(carboxylate ether)-based superplasticizer with a concentration of between about 0.8 wt % and about 1.2 wt %; and water with a concentration of between about 14 wt % and about 16 wt %. Alternatively, the fly ash may be replaced with ground granulated blast furnace slag (GGBFS). In an embodiment, the powdered glass can be powdered recycled glass cullet. The glass cullet may be ground to have an average particle size of about 10 μm or less.

By way of non-limiting examples, the sand may be red dune sand or, alternatively, white sand, and the cement may be Portland cement or, alternatively, white cement. Additionally, a viscosity modifying agent (VMA) may be added, particularly when the mixture has a relatively low cement content. The cementitious mixture may also include polyvinyl alcohol (PVA) microfibers at a concentration between about 1 wt % and about 3 wt %.

To make the cementitious mixture, the glass is first ground to produce the powdered glass. The powdered glass is then mixed with the cement, the fly ash, and the sand to form a mixture of solids, with each component being in the respective concentration range given above. The poly(carboxylate ether)-based superplasticizer is then mixed with water to create a liquid mixture, with each component being in the respective concentration range given above. The mixture of solids and the liquid mixture are then mixed to form the cementitious mixture. The polyvinyl alcohol microfibers may be added during the mixing of the solids with the liquid mixture. The cementitious mixture may then be cast in molds and, after sufficient time, be removed therefrom and cured.

These and other features of the present subject matter will become readily apparent upon further review of the following specification.

BRIEF DESCRIPTION OF DRAWINGS

The patent or application file contains at least one drawing executed in color. Copies of this patent or patent application publication with color drawing(s) will be provided by the Office upon request and payment of the necessary fee.

Similar reference characters denote corresponding features consistently throughout the attached drawings.

DETAILED DESCRIPTION

Figure 1A:
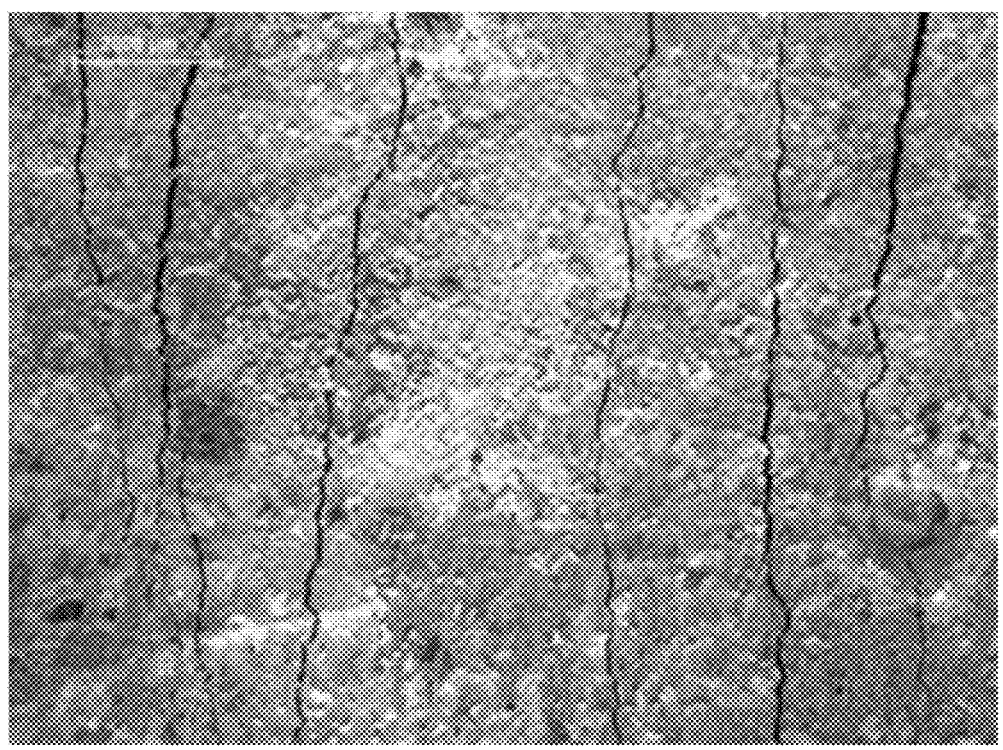
FIG. 1A is a microscope image of crack formation in a sample prepared from the cementitious mixture with a powdered glass concentration of 25 wt %.

The following definitions are provided for the purpose of understanding the present subject matter and for construing the appended patent claims.

Definitions

Throughout the application, where compositions are described as having, including, or comprising specific components, or where processes or methods are described as having, including, or comprising specific process steps, it is contemplated that compositions of the present teachings can also consist essentially of, or consist of, the recited components, and that the processes or methods of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter as described herein relates to a cementitious mixture that can include cement with a concentration of between about 5 wt % and about 20 wt %; powdered glass with a concentration of between about 5 wt % and about 35 wt %; fly ash with a concentration of between about 20 wt % and about 40 wt %; sand with a concentration of between about 18 wt % and about 25 wt %; a poly(carboxylate ether)-based superplasticizer with a concentration of between about 0.8 wt % and about 1.2 wt %; and water with a concentration of between about 14 wt % and about 16 wt %. Alternatively, the fly ash may be replaced with ground granulated blast furnace slag (GGBFS). The powdered glass, in an embodiment, can be recycled glass cullet. The glass cullet may be ground to have an average particle size of about 10 μm or less.

In non-limiting examples, the sand may be red dune sand from Saudi Arabia, which primarily contains quartz and iron oxide, and the cement may be Portland cement or, alternatively, white cement. In experiments, the red dune sand from Saudi Arabia had the following chemical composition: 91.69 wt % $SiO_2$, 3.56 wt % $Al_2O_3$, 1.32 wt % $Fe_2O_3$, 1.08 CaO, and 1.45 wt % $Na_2Oeq$. Additionally, a viscosity modifying agent (VMA) may be added, particularly when the mixture has a relatively low cement content. The cementitious mixture may also include polyvinyl alcohol (PVA) microfibers with a concentration of between 1 wt % and 3 wt %. The density of the cementitious mixture may be up to 1300 kg/m3.

When ground, the glassy nature and silicate structure of glass cullet makes its powder an ideal material to minimize the frictional force normally created between PVA and the cementitious matrix due to hydrophilicity of polyvinyl alcohol compounds. The insertion of glass cullet powder can thus reduce the frictional force and facilitates microfiber slippage under tension, which initiates the formation of microcracks and supports their propagation while controlling the crack opening.

Further, in certain embodiments, the production of strain-hardening cementitious composites (SHCC) is possible due to the inclusion of fly ash, cement, and fine aggregate in addition to microfibers such as polyvinyl alcohol (PVA) microfibers. When ground, the glassy nature and silicate structure of glass cullet can make its powder the ideal material to minimize the frictional force normally created between PVA and cementitious matrix due to the hydrophilicity of polyvinyl alcohol compounds. The insertion of glass cullet powder can reduce the frictional force and facilitates microfiber slippage under tension, which can initiate the formation of microcracks and supports their propagation while controlling the crack opening.

Figure 2:
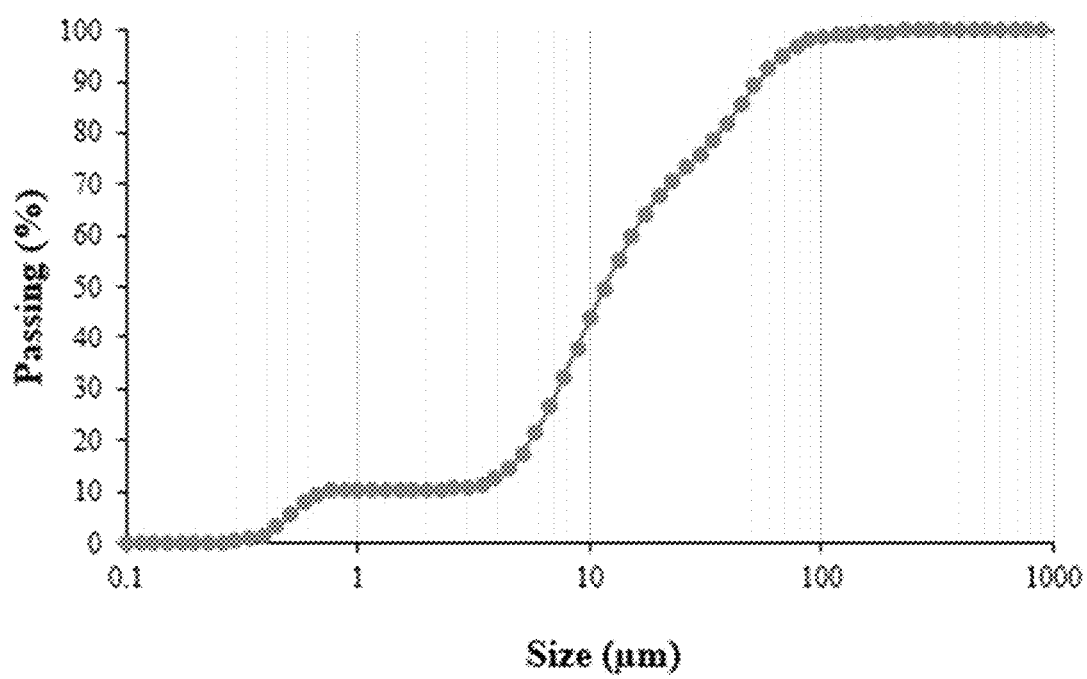
FIG. 2 is a plot showing particle size distribution of powdered glass used in the preparation of the cementitious mixture.

To make the cementitious mixture, the glass can first be ground to produce the powdered glass. In experiments, recycled glass cullet was ground using a Pulverisette® 5 planetary mill manufactured by Fritsch® of Germany for a period of two hours. FIG. 2 shows the particle size distribution following the two hour period of grinding. In FIG. 2, the passing percentage is the percentage of particles which pass the corresponding size indicated on the horizontal axis of the graph. Additionally, Table 1 below shows the chemical analysis of the powdered glass cullet compared to Portland cement, white cement, fly ash and ground granulated blast furnace slag (GGBFS), particularly showing that the powdered glass cullet makes an excellent supplement to, or replacement for, cement.

TABLE 1

Chemical Analysis

| Oxides (%) | Portland cement | White cement | Fly ash | GGBS | Powdered glass cullet |
|---|---|---|---|---|---|
| SiO$_2$ | 20.41 | 23.14 | 55.23 | 34.53 | 68.83 |
| Al$_2$O$_3$ | 5.32 | 4.83 | 25.95 | 14.23 | 0.36 |
| Fe$_2$O$_3$ | 4.1 | 0.23 | 10.17 | 0.66 | 0.08 |
| CaO | 64.14 | 68.0 | 1.32 | 41.38 | 0.34 |
| MgO | 0.71 | 0.43 | 0.31 | 5.59 | 4.14 |
| SO$_3$ | 2.44 | 2.70 | 0.18 | 0.60 | 0.24 |
| TiO$_2$ | 0.30 | 0.37 | — | — | — |
| Na$_2$Oeq | 0.1 | 0.18 | 0.86 | 0.21 | 20.45 |
| Loss on Ignition (LOI) | 2.18 | Nil | 5 | 2.45 | 5.45 |

The powdered glass is then mixed with the cement, the fly ash and the sand to form a mixture of solids, with each component being in the respective concentration range given above. In experiments, the dry solid materials were poured into a bowl and homogenized using a mixer paddle at speed #1 (about 100 RPM) for a few minutes until they were visually homogenized.

The poly(carboxylate ether)-based superplasticizer is then mixed with water to create a liquid mixture, with each component being in the respective concentration range given above. The mixture of solids and the liquid mixture are then mixed to form the cementitious mixture. In experiments, an optimized amount of superplasticizer was added to the water, homogenized, and gently poured into the bowl with the homogenized dry solid mixture while the mixer paddle was still mixing at speed #1. Mixing proceeded for about four minutes, after which the mixer was stopped for about 30 seconds to push any part of the mixture which had coated the bowl's wall back to the bowl's bottom.

The polyvinyl alcohol (PVA) microfibers may be added during the mixing of the solids with the liquid mixture. In experiments, the mixing process was restarted, again at speed #1, with mixing proceeding for five minutes. At this point, the PVA microfibers were added, with individual fiber strands being sheared by hand. Once the desired quantity of PVA microfibers was added, the mixer paddle was shifted to speed #2 for two minutes.

Figure 3:
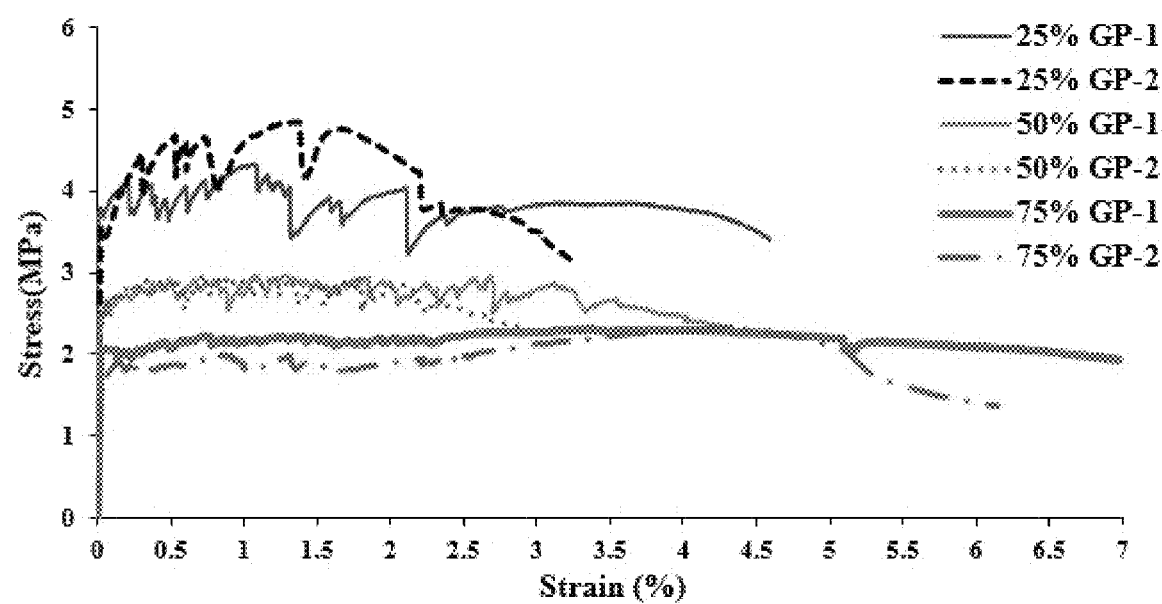
FIG. 3 is a graph comparing stress-strain tensile properties of samples prepared using the cementitious mixture with powdered glass concentrations of 25 wt %, 50 wt % and 75 wt % after a 28 day curing period.

In order to test the cementitious mixture, the fresh mixture was cast in dumbbell-shaped molds with dimensions of 40 mm×24 mm (in the narrow part of the "dumbbell" shape)× 240 mm in the form of layers pushed over each other. After 24 hours, the samples were demolded and cured under standard conditions, with a temperature of 20±2° C. and 100% R.H for 28 days. After 28 days, the samples were removed from the curing chamber, dried, installed in a gripping system, and then tested using a direct tension test on a 30-kN tension and compression testing machine (Model 3367 manufactured by Instron® of Massachusetts). Testing was performed under a strain rate of 0.2 mm/min. Linear variable differential transformers (LVDTs) connected to each sample during testing each had a gauge length of 65 mm. The tensile load and accompanying displacement for each sample were collected and monitored using an electronic digital data logger recording system. The resulting data is shown in FIG. 3. FIG. 3 shows the stress-strain tensile properties for two samples each (indicated as "GP-1" and "GP-2") prepared with 25 wt %, 50 wt % and 75 wt % glass cullet powder at a curing age of 28 days.

Figure 1B:
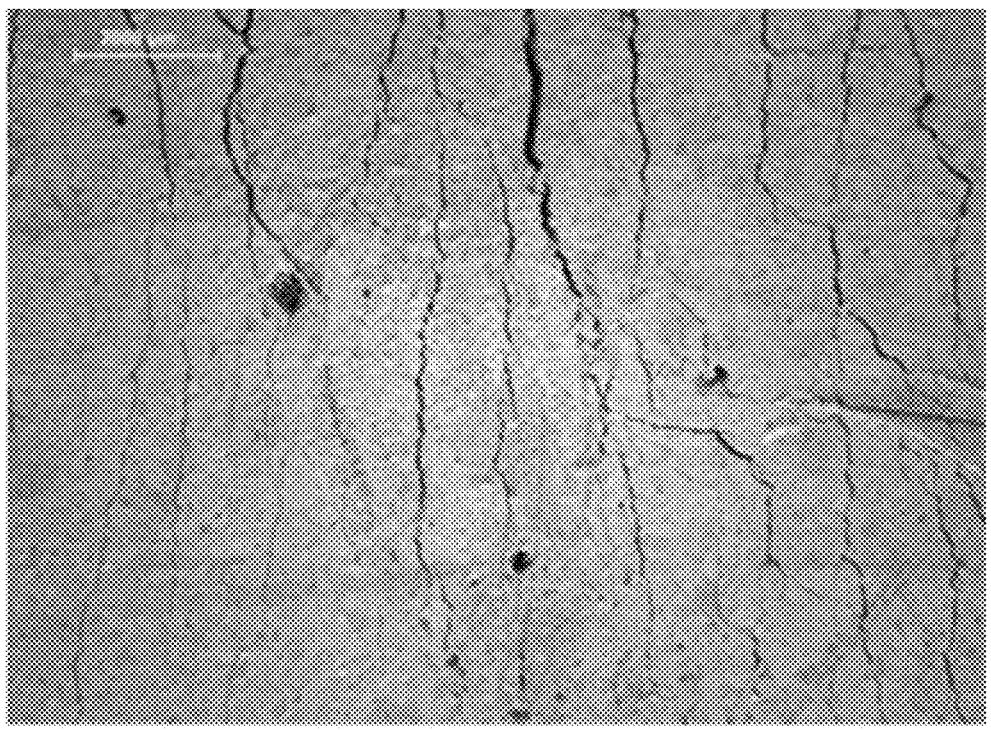
FIG. 1B is a microscope image of crack formation in a sample prepared from the cementitious mixture with a powdered glass concentration of 50 wt %.
Figure 1C:
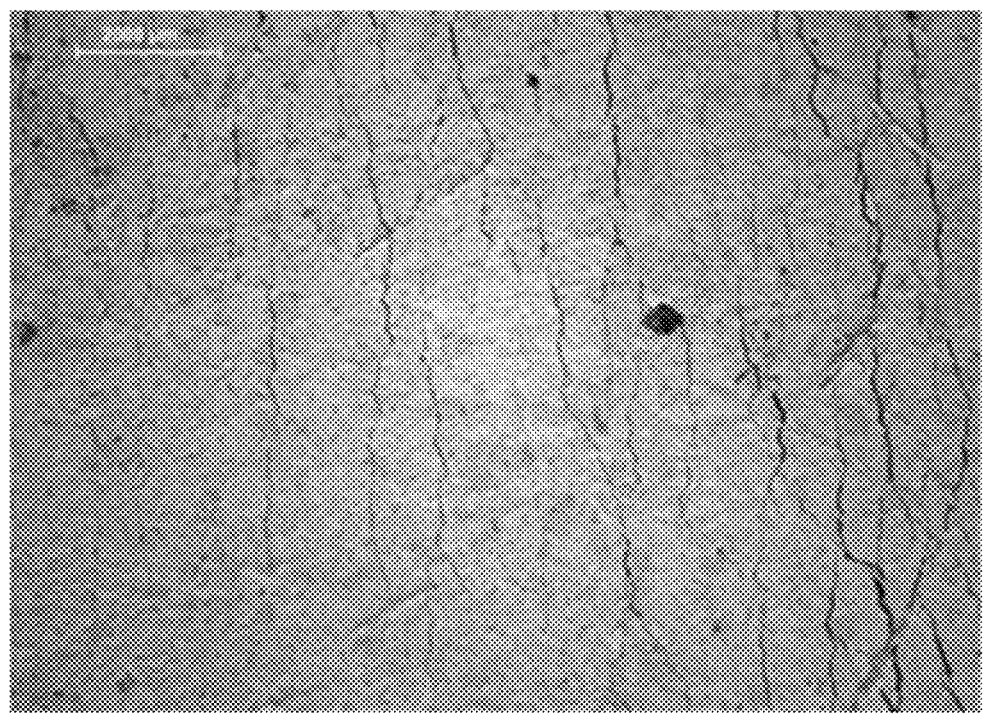
FIG. 1C is a microscope image of crack formation in a sample prepared from the cementitious mixture with a powdered glass concentration of 75 wt %.

Cracking of the samples was investigated and evaluated using stereo-microscopic analysis performed with a Leica® EZ4 HD stereo microscope with a built-in high-definition camera and a calibrated system for direct crack measurements. The stress-strain tensile properties shown in FIG. 3 provide insight into the strain-hardening response of the composites under direct tensile stress. The persistent and increasing stress under continuous deformation due to microcrack formation is a good indication for reaching the optimized mixture with the crack propagation process due to the bridging effect of the dispersed microfibers along the longitudinal axis. The microcrack formation was confirmed using the Leica® EZ4 HD stereo microscope, which provided accurate measurements of crack openings and the space between the cracks. The higher the number of cracks, the higher the ductility of the sample and, accordingly, the optimized proportion of the ingredients used in the cementitious composite preparation. This mechanism can be reached only when there is a balance between the fracture toughness of the cementitious matrix and the bonding with fibers, the degree of dispersion of fibers, and their slip hardening properties. These overall tailored properties are obtained only in optimized mixes. The presence of the glass cullet powder greatly contributes to efficiently gaining the essential balance for strain-hardening properties. FIGS. 1A, 1B and 1C are the resultant microscope images of crack formation in samples prepared from the cementitious mixture with powdered glass concentrations of 25 wt % (concentration after curing, with no remaining water in the sample), 50 wt %, and 75 wt %, respectively.

As noted above, the glassy nature of the glass cullet particles improves the strain hardening properties of the resultant product due to the presence of the polyvinyl alcohol (PVA) microfibers and enhances the fiber pullout mechanism. As found during testing, particularly when the cement content reached 5 wt %, the cementitious mixture resulted in strain hardening properties with a strain capacity of about 500 times (5%) that of normal concrete (0.01%), with an ultimate tensile stress of about 2.2 MPa.

It is to be understood that the cementitious mixture and the method of making the same is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A cementitious mixture, comprising:
    cement with a concentration of between about 5 wt % and about 20 wt %;
    powdered glass with a concentration of between about 5 wt % and about 35 wt %;
    fly ash with a concentration of between about 20 wt % and about 40 wt %;
    sand with a concentration of between about 18 wt % and about 25 wt %;
    a poly(carboxylate ether)-based superplasticizer with a concentration of between about 0.8 wt % and about 1.2 wt %; and
    water with a concentration of between about 14 wt % and about 16 wt %.

2. The cementitious mixture as recited in claim 1, wherein the powdered glass is powdered glass cullet.

3. The cementitious mixture as recited in claim 1, wherein the powdered glass has an average particle size of about 10 µm or less.

4. The cementitious mixture as recited in claim 1, wherein the sand comprises red sand.

5. The cementitious mixture as recited in claim 1, wherein the cement comprises Portland cement.

6. The cementitious mixture as recited in claim 1, wherein the cement comprises white cement.

7. The cementitious mixture as recited in claim 1, further comprising a viscosity modifying agent.

8. The cementitious mixture as recited in claim 1, further comprising polyvinyl alcohol microfibers.

9. The cementitious mixture as recited in claim 8, wherein a concentration of the polyvinyl alcohol microfibers is between about 1 wt % and about 3 wt %.

10. A cementitious mixture, comprising:
   cement with a concentration of between about 5 wt % and about 20 wt %;
   powdered glass with a concentration of between about 5 wt % and about 35 wt %;
   ground granulated blast furnace slag with a concentration of between about 20 wt % and about 40 wt %;
   sand with a concentration of between about 18 wt % and about 25 wt %;
   a poly(carboxylate ether)-based superplasticizer with a concentration of between about 0.8 wt % and about 1.2 wt %; and
   water with a concentration of between about 14 wt % and about 16 wt %.

11. The cementitious mixture as recited in claim 10, wherein the powdered glass is powdered glass cullet.

12. The cementitious mixture as recited in claim 10, wherein the powdered glass has an average particle size of about 10 µm or less.

13. The cementitious mixture as recited in claim 10, wherein the sand comprises red sand.

14. The cementitious mixture as recited in claim 10, wherein the cement comprises Portland cement.

15. The cementitious mixture as recited in claim 10, wherein the cement comprises white cement.

16. The cementitious mixture as recited in claim 10, further comprising a viscosity modifying agent.

17. The cementitious mixture as recited in claim 10, further comprising polyvinyl alcohol microfibers.

18. The cementitious mixture as recited in claim 17, wherein a concentration of the polyvinyl alcohol microfibers is between about 1 wt % and about 3 wt %.

19. A method of making a cementitious mixture, comprising the steps of:
   grinding glass to produce a powdered glass;
   mixing the powdered glass with a concentration of between about 5 wt % and about 35 wt % of the cementitious mixture, cement with a concentration of between about 5 wt % and about 20 wt % of the cementitious mixture, fly ash with a concentration of between about 20 wt % and about wt % of the cementitious mixture, and sand with a concentration of between about 18 wt % and about 25 wt % of the cementitious mixture to form a first mixture;
   adding a poly(carboxylate ether)-based superplasticizer with a concentration of between about 0.8 wt % and about 1.2 wt % of the cementitious mixture to water with a concentration of between about 14 wt % and about 16 wt % of the cementitious mixture to form a second mixture; and
   mixing the first mixture and the second mixture to form the cementitious mixture.

20. The method of making a cementitious mixture as recited in claim 19, further comprising the step of adding polyvinyl alcohol microfibers to the cementitious mixture, wherein a concentration of the polyvinyl alcohol microfibers is between about 1 wt % and about 3 wt %.

* * * * *